United States Patent
Kindell et al.

(10) Patent No.: US 6,725,872 B2
(45) Date of Patent: Apr. 27, 2004

(54) STAKE ASSEMBLY HAVING A CONTROLLER

(76) Inventors: Gary R. Kindell, 302 E. Phillips, Ripley, OK (US) 74062; Sharon D. Kindell, P.O. Box 283, Ripley, OK (US) 74062

(*) Notice: Subject to any disclaimer, the term of this patent is extended or adjusted under 35 U.S.C. 154(b) by 0 days.

(21) Appl. No.: 10/053,924

(22) Filed: Jan. 24, 2002

(65) Prior Publication Data

US 2003/0136438 A1 Jul. 24, 2003

(51) Int. Cl.7 .............................................. E04H 15/62
(52) U.S. Cl. ..................... 135/118; 135/120.4; 119/786; 119/791; 52/155
(58) Field of Search ...................... 135/118, 120.4; 52/156, 155, 162, 148, 147; 119/786, 787, 791; 47/43

(56) References Cited

U.S. PATENT DOCUMENTS

| | | | | |
|---|---|---|---|---|
| 289,033 A | * | 11/1883 | Shattuck | 119/788 |
| 302,374 A | * | 7/1884 | Baker | 111/49 |
| 429,111 A | * | 6/1890 | Bailey | 119/786 |
| 695,427 A | * | 3/1902 | Davis | 47/43 |
| 1,579,294 A | * | 4/1926 | Fishk | 473/147 |
| 1,700,224 A | * | 1/1929 | Hendersen | 473/147 |
| 1,730,176 A | * | 10/1929 | Thrasher et al. | 473/143 |
| 2,507,383 A | * | 5/1950 | Schiel et al. | 119/781 |
| 2,525,890 A | * | 10/1950 | Gage | 119/787 |
| 2,713,327 A | * | 7/1955 | West | 119/790 |
| 2,790,419 A | * | 4/1957 | Sullivan | 119/786 |
| 2,952,024 A | * | 9/1960 | Bartolucci | 4/503 |
| 3,189,004 A | * | 6/1965 | Sinclair | 119/789 |
| 3,279,133 A | * | 10/1966 | Korte | 52/103 |
| 3,658,037 A | * | 4/1972 | Hunter | 119/786 |
| 3,952,878 A | * | 4/1976 | Gorham | 211/64 |
| 4,471,553 A | * | 9/1984 | Copeland | 43/15 |
| 4,640,049 A | * | 2/1987 | Duncan | 49/197 |
| 4,750,508 A | * | 6/1988 | Tatoian | 135/87 |
| 5,542,679 A | * | 8/1996 | Caso | 108/150 |
| 5,867,936 A | * | 2/1999 | Napolitano | 47/43 |
| 5,992,435 A | * | 11/1999 | Kindell et al. | 135/118 |
| 6,098,970 A | * | 8/2000 | Lowe | 267/179 |
| 6,301,830 B1 | * | 10/2001 | Whipple | 47/43 |

* cited by examiner

*Primary Examiner*—Winnie S. Yip
(74) *Attorney, Agent, or Firm*—Gardere Wynne Sewell LLP; Jason R. Fulmer (57) ABSTRACT

A stake assembly includes a spike having a first end and a second end defining a longitudinal axis of the stake assembly. A flange is connected at the second end of the spike and extends laterally therefrom and defines the upper end of the substantially inflexible portion of the stake assembly. A resilient fastening member is connected to the spike, extends upwardly therefrom and is resilient in both lateral and longitudinal directions. A controlling member is connected to the spike, extends upwardly and is connected to the second end of the resilient fastening member. A tether or leash may be fastened to the second end of the resilient fastening member.

18 Claims, 5 Drawing Sheets

*Fig. 11*

STAKE ASSEMBLY HAVING A CONTROLLER

TECHNICAL FIELD

This invention relates to stake assemblies and devices and more particularly, but not by way of limitation, to a stake assembly which has no rigid structure extending obstructively above ground and has a limiting or controlling device to restrict expansion of the device during stress thereon.

BACKGROUND ART

The use of various types of stakes and tethering devices to restrain animals, tents, boundary wires and lines, and the like, are known. Generally, such devices have included a rigid post which is driven or screwed into the ground, or otherwise attached to the ground, with a rigid end thereof protruding above the ground. The animal or object to be restrained is tethered to the protruding end of the post. The protruding end of the rigid post creates a safety hazard in that it may be stepped on, tripped over, or fallen into, thereby causing injury; and also causes operational problems, particularly when used to restrain an animal, such as a dog, in that the tether connecting the animal to the protruding end, wraps around the protruding end as the animal circumnavigates the post until the freedom of the animal is unnecessarily and perhaps dangerously restrained.

A device to alleviate these problems is described in U.S. Pat. No. 5,992,435 filed Oct. 24, 1997 and issued Nov. 30, 1999 to Gary R. Kindell and Sharon D. Kindell.

In the testing and research of this patented invention, it was discovered that the device functioned exceptionally well and solved many of the problems associated with stake assemblies which had above ground rigid structure. However during subsequent research, it was later realized that the stake assembly could be damaged and ruined by excessive tinsile forces.

The inventors of U.S. Pat. No. 5,992,435 therefore researched various apparatus which would limit the force exertable on the above ground coil spring of the invention and thereby detrimentally damage the apparatus.

The present invention is directed to overcome one or more of the heretofore problems, as set forth above.

DISCLOSURE OF THE INVENTION

A stake assembly is provided for placing in the ground so that the stake assembly has no rigid structure extending substantially above the surface of the ground and whose flexibility in a linear direction is controlled.

The stake assembly has a spike which has first and second ends defining a longitudinal axis of the stake assembly.

A flange is connected at the second end of the spike and extends laterally therefrom. The flange has a lower surface facing the first end of the spike for covering the surface of the ground adjacent to the spike and limiting the penetration of the stake assembly into the ground. An upper surface forms the axial extremity of the second end of the spike so that the second end of the spike and the upper surface of the flange are adapted to be substantially flush with the surface of the ground when the spike assembly is placed in the ground.

A receptacle extends axially into the flange in a direction from the second toward the first end of the spike;

A resilient fastening member is provided which has a first end connected to the spike within the receptacle at a location between the lower surface of the flange and the first end of the spike, and a second end extending out of the receptacle beyond the upper surface of the flange. The resilient fastening member is both axially and laterally resilient continuously between the first and second ends of the resilient fastening member so that the stake assembly has no rigid structure extending beyond the upper surface of the flange at any time.

A controlling member is provided which has first and second ends and is laterally flexible, substantially linearly inflexible and which has a length greater than the resilient fastening member in its normal unstressed condition. The first end of the controlling member is connected to the spike within the receptacle. The second end of the controlling member is connected to the second end of the resilient fastening member for limiting the amount of movement of the fastening member second end in a direction from the second end of the spike.

BEST MODE FOR CARRYING OUT THE INVENTION

Preferred embodiments of the invention will now be described with reference to the drawings. Like reference numerals or characters refer to like or corresponding parts throughout the drawings and description.

FIGS. 1–5 present embodiments of the stake assembly 20 of the present invention. Although a preferred embodiment of the invention is described herein as being used with an animal tether, it is intended to be understood that the invention may be used as a stake assembly for animals, tents, guy lines, boundary marking lines, and the like. This is particularly important to realize since the current combination invention is now constructed to coordinate sizing of various elements of the assembly and prevent deformation thereof and/or damage thereto.

Figure 1:
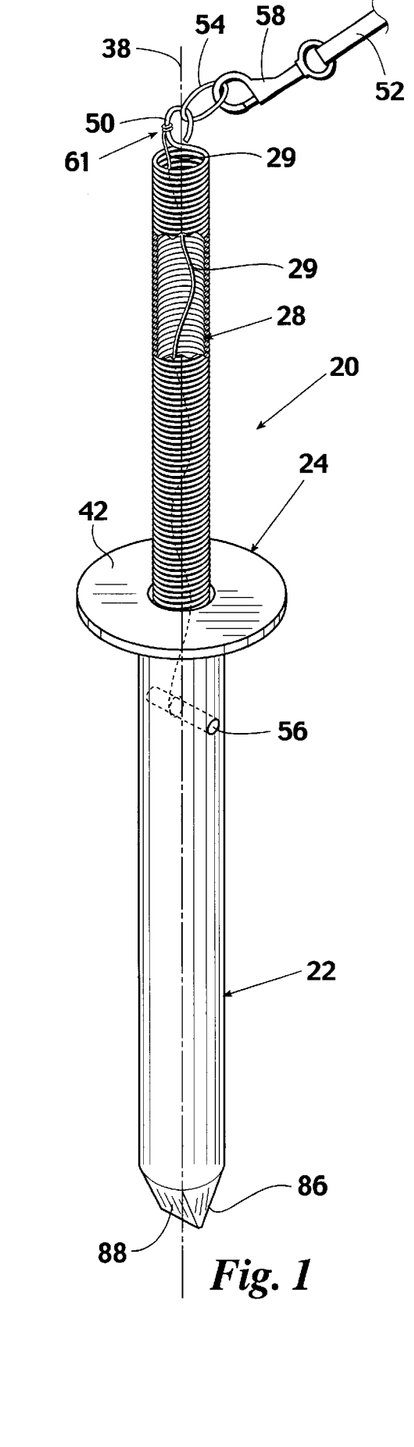
FIG. 1 is a diagrammatic perspective view of the spike assembly with a tether and tether clip connected thereto and containing the controlling member of this invention.

Referring to the example of FIG. 1, in a preferred embodiment, the stake assembly 20 may be generally described as including a spike 22, a flange 24, a receptacle or chamber 26, a resilient fastening member 28, and a controlling member 29.

The spike 22 has a first end 34 and a second end 36 which define a longitudinal axis 38 of the stake assembly 20. The flange 24 is connected at the second end 36 of the spike 22 and extends laterally therefrom. The flange 24 has a lower surface 40 facing or directed towards the first end 34 of the spike and an upper surface 42. In the preferred embodiment, the upper surface 42 of the flange 24 from the axial extremity of the second end 36 of the spike 22. The receptacle 26 extends axially into the flange 24 towards the first end 34 of the spike 22. The resilient fastening member 28 has a first end 48 connected in the receptacle 26 between the lower surface 40 of the flange 24 and the first end 34 of the spike 22, and a second end 50 extending out of the receptacle 26 beyond the upper surface 42 of the flange 24.

Figure 2:
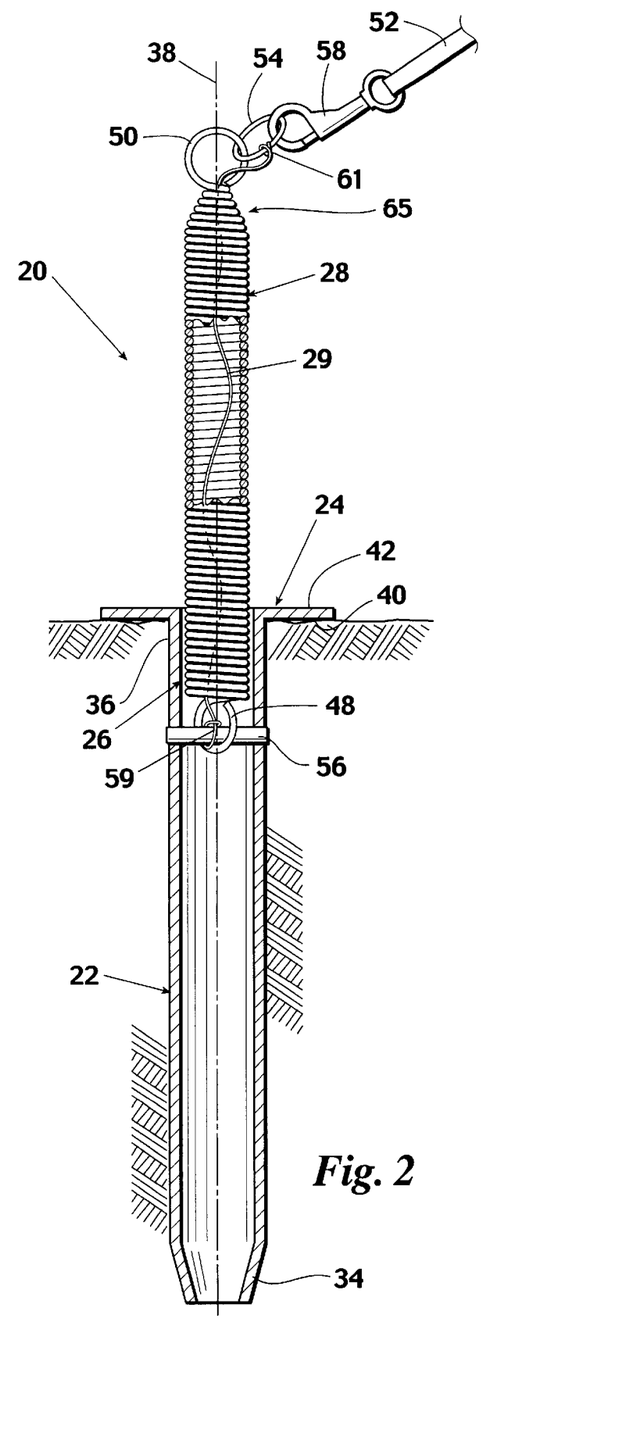
FIG. 2 is a diagrammatic cross-sectional view along line 2—2 of FIG. 1 with the spike assembly installed in the ground and the resilient fastening member in the normal unstressed condition.
Figure 3:
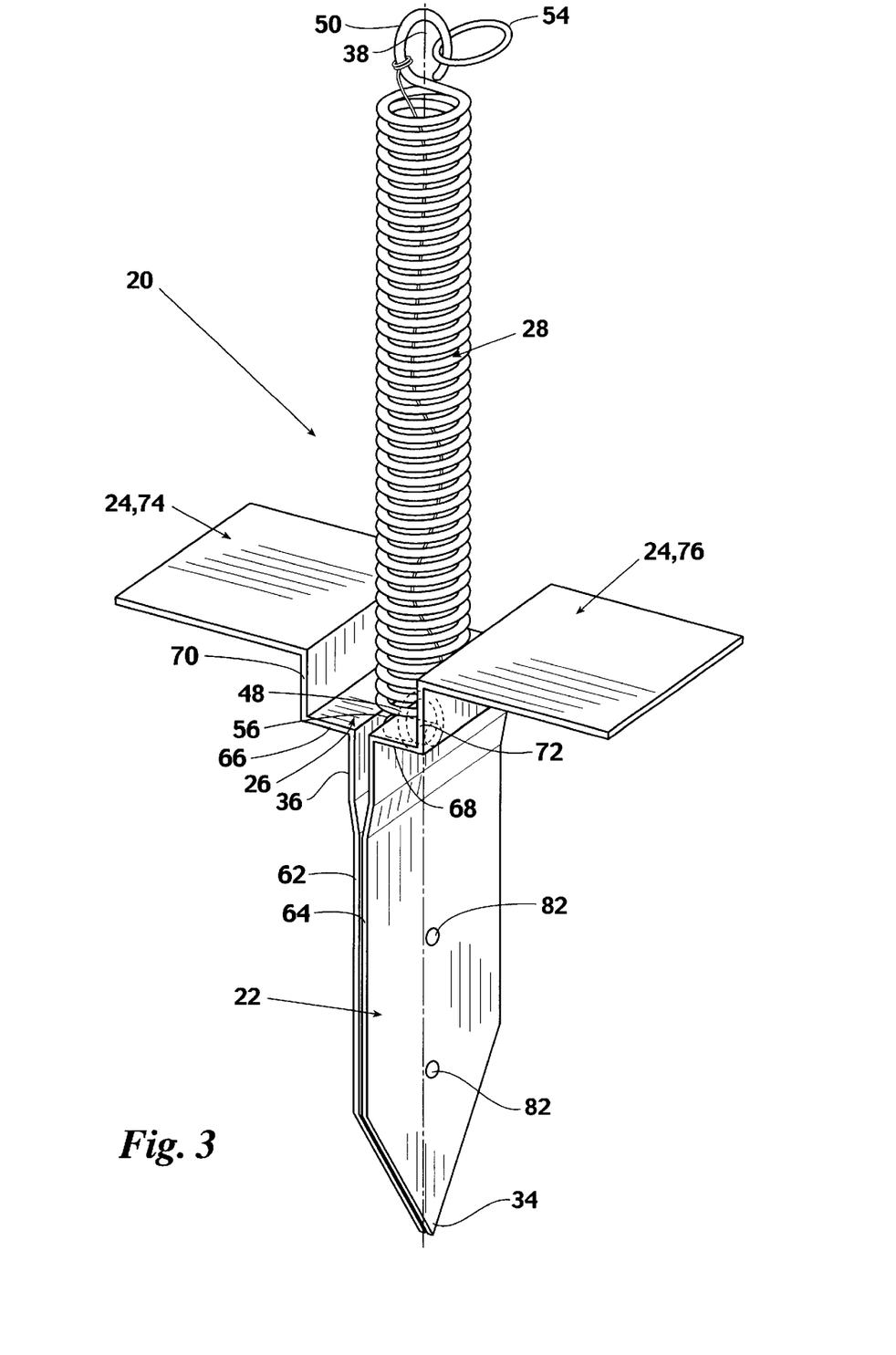
FIG. 3 is a diagrammatic perspective view of another embodiment of the apparatus of this invention having a generally rectangular spike and a spiral spring with the controlling member attached thereto.

The flange 24 may extend partially around the spike 22 and may extend laterally on one or more sides of the spike 22, as shown in FIG. 3. In the example embodiment of FIG. 3, the flange 24 extends transversely on two diametrically opposing sides of the stake assembly 20. In the more preferred embodiments of the invention, referring to the example of FIGS. 1 and 2, the flange 24 circumscribes the stake assembly. The flange 24 may be integrally formed with the spike 22 or securely fastened to the spike 22, such as by chemical bonding, welding, riveting, mechanical threads, friction fit, and the like. The flange 24 also serves to limit the penetration of the stake assembly 20 into the ground and to thereby provide the desired lateral resilience and flexibility of the resilient fastening member 28. i.e., if more than about half the length of the resilient fastening member 28 is encased by the spike 22 or the ground, the resilience and flexibility is impaired. The flange 24 also prevents weeds and foliage from growing directly into the fastening member 28 and facilitates mowing of all grass and foliage around the stake assembly 20, i.e., a lawn mower can mow over the flange 24.

The preferred resilient fastening member 28 has insufficient resistance to both lateral and to axially compressive forces to injure a human being that walks into or falls onto the stake assembly 20. The resilient fastening member 28 resiliently or elastically stretches when subject to tensile forces in the axial direction and returns to its original position and shape when the force is removed. Preferably, the resistance of the resilient fastening member 28 to tensile forces increases as the tensile forces stretch the resilient fastening member 28 in order to reduce the likelihood of injury to a pet, or other animal, that is tethered to the stake assembly 20 and runs or pulls against the stake assembly 20.

The resilient fastening member 28 may be any resilient or elastic member having the previously described properties. For example, the resilient fastening member 28 may be bungee cord or various types of mechanical springs. In the preferred embodiment, the resilient fastening member 28 is a coil type spring. The coil spring is preferred, particularly when used with animals, because it may be selected to have sufficient lateral strength to stand up when the stake assembly 20 is placed in the ground and to hold a tether 52 connected, preferably via ring 54, to the second end 50 of the coil spring 28 above the surface of the ground. This prevents the tether 52 from sweeping the ground and debris into the take assembly 20 as the animal moves around the stake assembly 20. The upright positioning of the coil spring 28 also provides some initial resistance as the animal and tether 52 begin to pull laterally on the stake assembly 20, thereby providing an initial signal the animal that it is approaching the limit of its tether. This both lengthens the life of the stake assembly 20 and reduces the risk of injury to the animal, as the animal will learn to recognize this initial signal and limit the forces it exerts on the stake assembly 20.

The upstanding or upright position of the coil spring 28 also gives a visual indication and warning of the presence of the stake assembly 20. The coil spring 28 may be spiral spring, i.e., a coil spring having spaces between the adjacent coils of the spring in order to reduce the likelihood of injury should something fall onto the upstanding spring 28. If such a spiral spring is used, the space between the adjacent coils of the ring should be small enough that the tether or leash 52 to be used with the stake assembly 20 cannot be caught in the spaces between the adjacent coils. The coil spring 28 is preferable to a bungee cord when the stake assembly 20 is used with animals because many animals can chew through the material of a bungee cord, whereas a metal coil spring is not susceptible to such damage.

Referring to the example of FIG. 1, in the prototype assembly 20 a connector 54, such as ring, snap ring, snap hook or other fastening device, such as would be known to one skilled in the art in view of the disclosure contained herein, is connected to the second end 50 of the spring 28 to facilitate fastening of a tether 52 to the stake assembly 20. In the preferred state assembly 20, the connector 54 is a ring. The inventors discovered that some types of tether clips 58 particularly snap-type clips, when connected directly to the second end 50 of the resilient fastening member 28, will bind on the relatively stiff second end 50 and disconnect from the second end 50 as the animal moves around the assembly 20, thereby disconnecting the tether 52 and the animal from the stake assembly 20. The connector 54 acts as a universal joint between the relatively stiff or rigid second end 50 and the tether clip 58 in that it allows much greater freedom of motion of the clip 58 and thereby prevents the clip 58 from binding on and disconnecting from the second end 50 of the resilient fastening member 28 as the animal and tether 52 move around the stake assembly 20.

The spike 22 may be a rod of solid material, hollow conduit, pipe, tube, or the like. The first end 34 of the spike 22 should allow penetration of the earth as easily as possible. For example, if the spike 22 is a solid rod very little, if any sharpening or shaping of the first end 34 of the spike 22 may be required. Preferably, as shown in FIGS. 1 and 2, the spike 22 is a hollow conduit, the first end 34 is closed, and tapered or pointed to facilitate penetration of the earth.

The receptacle or chamber 26 is defined by an opening or recess in the flange 24 and through the second end 36 of the spike 22. The receptacle 26 should have sufficient depth to structurally support the preferred upright position of the fastening member 28 and to prevent exertion of lateral forces on the first end 48 of the fastening member 28, thereby preventing structural fatigue of the connection of the first end 48 in the receptacle. 26. If the spike 22 is a solid rod, the receptacle 26 can be formed or excavated in the second end 36 of the spike 22. In FIGS. 1 and 2, the spike 22 is hollow conduit or pipe, and the receptacle 26 is simply the interior of the second end 36 of the pipe. A fastener 56, such as a pin, rivet, bolt, or the like, extends transversely through the spike 22 at the desired distance from the flange 24 in order to securely fasten the fastening member 28 within the receptacle 26 and to the spike 22.

A controlling member 29 has first and second ends 59,61 and has physical properties of being laterally flexible, substantially linearly inflexible, and having a length greater than the length of the unstressed resilient fastening member 28. The first end 59 is connected to the spike 22 within the receptacle 26 adjacent the first end 48 of the resilient fastening member 28. The second end 61 is connected to the second end 50 of the resilient fastening member 28.

The controlling member 29 can be a metal cable, nylon cord, or any linear apparatus which has the physical properties set forth above. Preferably, the controlling member 29 is a metal chain. The length of the controlling member 29 is dependant upon the length of the resilient fastening member 28 and the length of physical movement or stretch to which the fastening member 28 can be subjected without plastic deformation of the fastening member 28 in response to movement of the second end 61 a greater distance from the first end 59 thereof. Therefore the length of the controlling member 29 will be less than the length of movement at which the fastening member 28 is plastically deformed.

The controlling member 29 is connected at its first end 59 via element 56, passes upwardly through the center of the coil spring 28 and is connected at its second end 61 to the second end 50 of the coil spring 28. The connection of the second end 61 of the controlling member 29 to the second end 50 of the resilient fastening member or coil spring 28 is preferably via ring 54 (see FIG. 2) with both the second end connections 50,61 being direct connections to said ring 54. However, it should be understood that the second end 61 of the controlling member 29 can be directly connected to the second end 50 of the resilient fastening member 28 (see FIG. 3) with the fastening member 28 directly connectable to tether clip 58 or connectable to the tether clip 58 via ring 54. Conversely, the second end 50 of the resilient fastening member 28 can be directly connected to the second end 61 of the controlling member 29 with the controlling member directly connectable to the tether clip 58 or connectable to the tether clip 58 via ring 54. In any construction as set forth above, the second ends 50,61 of the respective resilient fastening member 28 and the controlling member 29 move together in response to a linear force subjected on one or the other of them. In the preferred embodiments of FIGS. 2 and 4, the upper end portion 65 of the resilient fastening member 28 is tapered to maintain the controlling member 29 within the cavity of the resilient fastening member 28. Preferably, all elements of the stake assembly 20 are preferably formed of metal.

Referring to FIGS. 1 and 3, it should be noted that the spring or resilient fastening member 28 is not tapered. With an open ended spring 28, the controlling member 29 can sometimes be trapped between adjacent spring coils during stress relief. This can cause damage to the assembly.

FIGS. 6–11 show various retainers 67 used for maintaining the controlling member 29 within the recess of the assembly.

Figure 6:
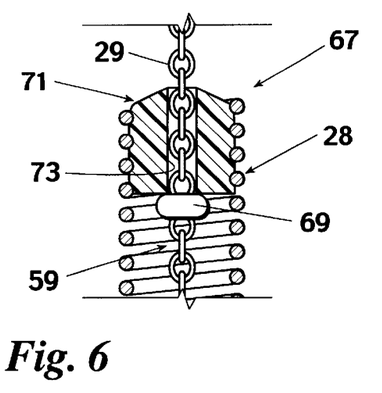
FIGS. 6–11 show retainers of various construction for maintaining the controlling member within the resilient fastening means.

FIG. 6 shows a stop element 69 fixedly connected to controlling member 29 at a location within the chamber or recess of the assembly. The stop element 69 cooperates with a plug 71 which has an opening 73 extending therethrough which passes the second end of the controlling member 29. The stop element 69 is larger in area than the opening 73 and thereby maintains the controlling member 29 within the chamber of the spring or controlling member 29.

Figure 7:
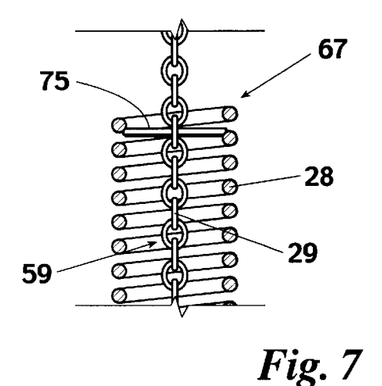
Figure 8:
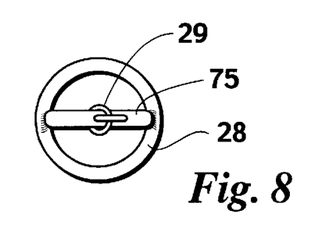

FIGS. 7 and 8 show another embodiment of apparatus for maintaining the controlling member 29 within the spring chamber. This embodiment is particularly useful where the controlling member 29 is a chain. In this embodiment, a holding member 75 is connected at opposed ends to the spring 28 with said holding member 75 passing through one of the links of the chain as better seen in FIG. 8.

Figure 9:
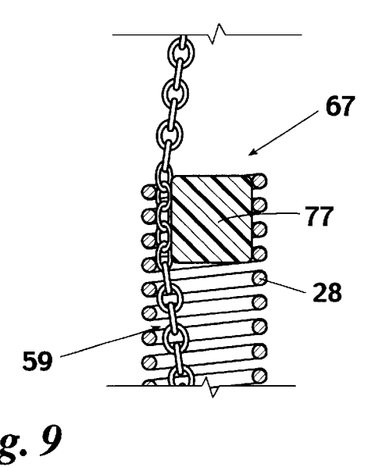

FIG. 9 shows a plug 77 of different configuration wherein the plug 77 traps the controlling member 29 between itself and the inner walls of the spring 28.

Figure 10:
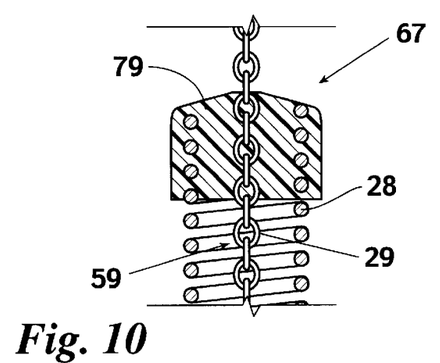

FIG. 10 shows a plug 79 which is fixedly attached to the spring 28 and encases a second end portion of the controlling member 29.

Figure 11:
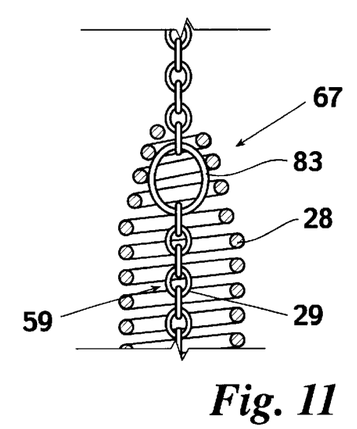

FIG. 11 shows a plug 81 of different configuration which can be used with a tapered spring 28 to further assure that the controlling member 29 is maintained within the spring 28. In this embodiment, a ring 83 is positioned within the length of the controlling member 29. Where the controlling member 29 is a chain, the ring 83 can be an enlarged link of the chain.

The plugs 71, 77,79,81 can be formed of various materials, but are preferably formed of organic plastic and of a size and configuration sufficient to be maintained within the spring 28 during use of the apparatus. To one skilled in the art, will become readily apparent that the plugs can be of various configurations, formed of various materials and be maintained with the spring 28 by bonding, friction fit, screw threads formed on the plug and others. It should be understood however, that the important physical function is that the retainer assembly 67 maintains the first end portion 59 of the controlling member 29 within the spring 28 during the use thereof.

Figure 4:
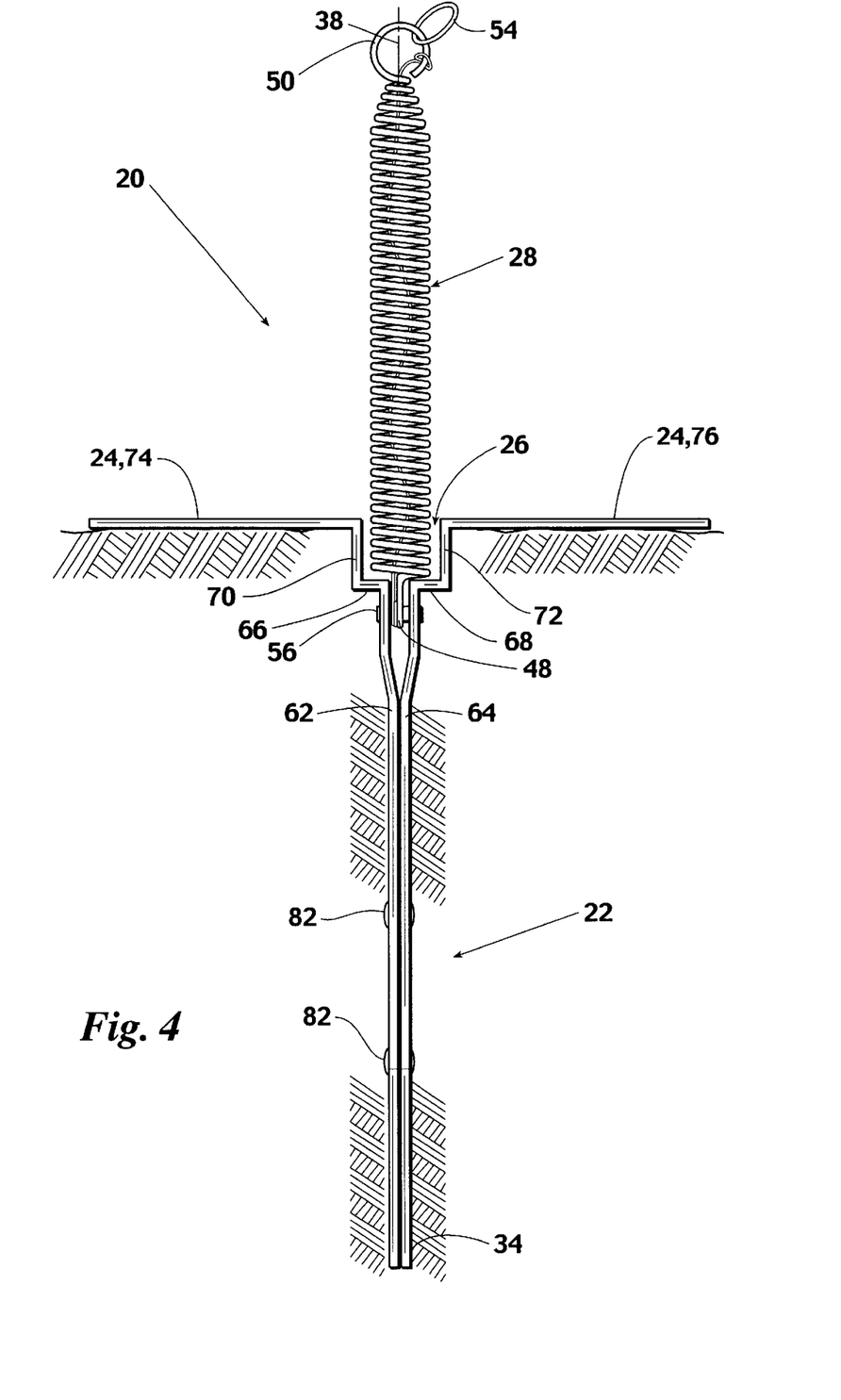
FIG. 4 is a diagrammatic cross-sectional view along line 4—4 of FIG. 3 with the spike assembly installed in the ground and the resilient fastening member in the normal unstressed condition.
Figure 5:
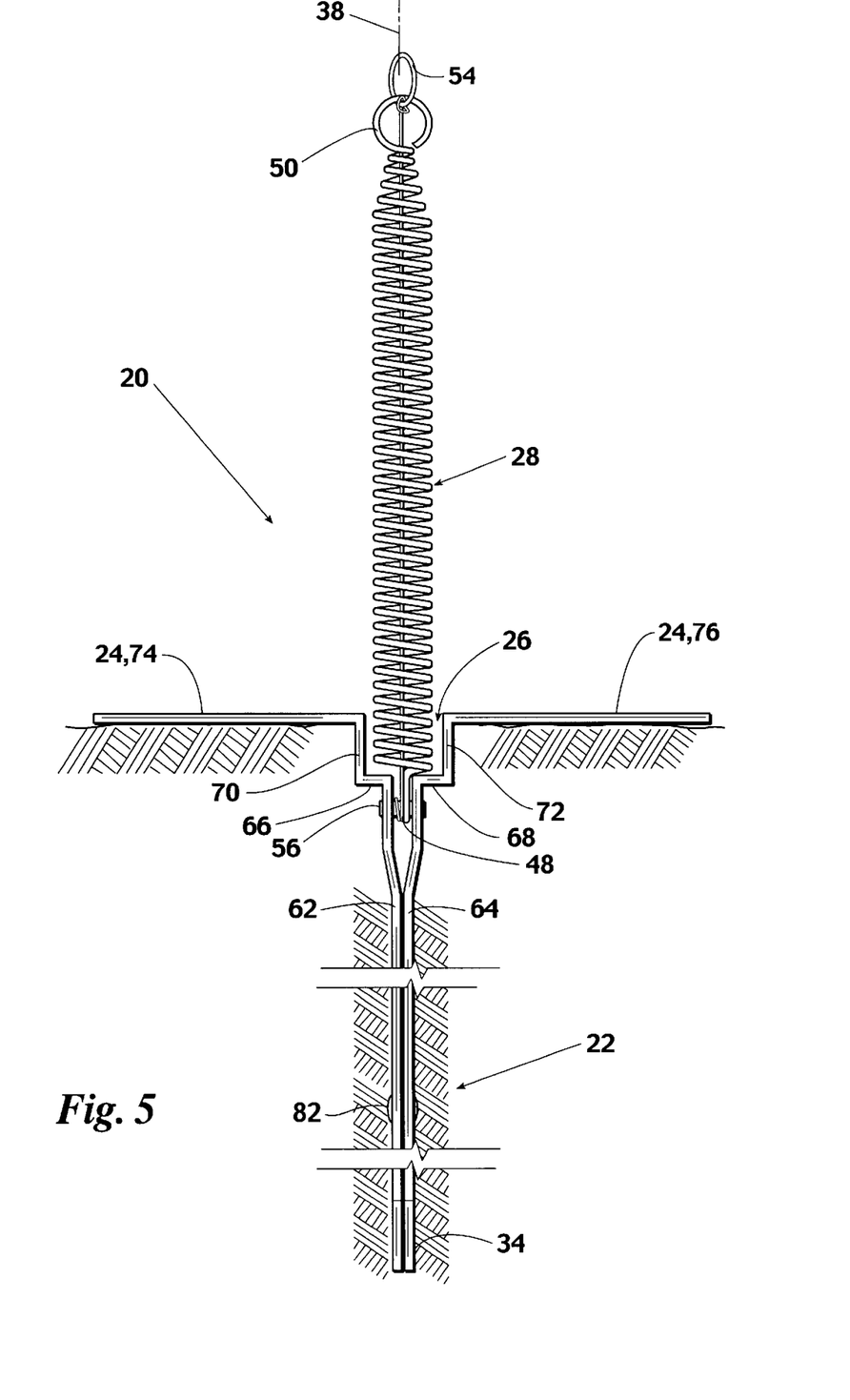
FIG. 5 is a diagrammatic partial view of the assembly of FIG. 4 in partial section showing the resilient fastening member in a stressed condition with the controlling member limiting the movement of the second end of the fastening member.

Referring to the example of FIGS. 3 and 4, in another embodiment of the stake assembly 20, the flange 24, receptacle 26, and spike 22 are made by bending or forming a strip or strips of metallic, PVC, organic plastic or polymeric material. Referring to the example of FIG. 4, when viewed in axial cross-section, the spike 22 is formed of first and second sides 62,64 of substantially flat strips of material. The receptacle 26 is created by bending the adjacent sides 62,64 symmetrically in opposite directions to form the bottom surfaces 66, 68 of the receptacle 26; bending the adjacent sides 62,64 symmetrically a second time towards each other to form the sides 70,72 of the receptacle 26; and symmetrically bending the adjacent sides 62,64 a third time in opposite directions to form diametrically opposing flanges 74,76.

As would be known to one skilled in the art in view of the disclosure contained herein, if the stake assembly 20 of FIGS. 3 and 4 is made of metallic material it may be formed by bending; if made of PVC polymer or organic plastics, it may be made by molding or extrusion, as appropriate to the material. As also would be known to one skilled in the art view of the disclosure contained herein, the stake assembly of FIGS. 3 and 4 may be made of one continuous strip of material by adding a 180 degree bend at the first end 34 of the spike 22. The first and second adjacent sides 62,64 may be secured together by brads 82. The brads 82 may be replaced by rivets, clips, bolts, screws, adhesives, welding, or other known methods of fastening. Preferably fastener 56 is connected through the adjacent sides 62,64 adjacent to the bottom surfaces 66,68 of the receptacle 26. The fastener 56 may be a pin, bolt, screw, rivet, brad, or equivalent fastening device, as would be known to one skilled in the art in view of the disclosure contained herein. The first end 34 of the spike 22 created by the adjacent sides 62,64 should be shaped or pointed to facilitate penetration of the earth by forming, molding, bending, cutting, grinding, or the like.

A prototype of the stake assembly 20 will now be described in grater detail with reference to FIGS. 1 and 2 to facilitate understanding of the invention. In the prototype, the spike 22 is a 9-inch length of metal pipe having a ¾-inch internal diameter. The first end 34 is closed by hammering, bending, pressing, or the like. Beveled edges 86,88, are provided by cutting, grinding, bending, pressing, or the like. The second end 36 of the spike 22 includes external threads, and the flange 24 is threaded onto the second end 36 of the spike 22. The upper surface 42 of the flange 24 may be flush with the second end 36 of the spike 22, and the upper surface 42 of the flange 24 should define the axial extremity of the spike 22, as previously discussed. The prototype resilient fastening member 28 is an 8 inch long coil spring. The outside diameter of the spring 28 is approximately $\frac{1}{16}$-inch smaller than the internal diameter of the receptacle 26 so that the spring 28 slides easily into the receptacle 26 and the receptacle gives lateral support to the spring 28. A metal pin 56 is securely fastened across the diameter of the pipe 22 two inches below the flange 24 and securely fastens the spring 28 and controlling member 29 within the receptacle 26 formed by the pipe 22 and so that the spring 28 extends about two inches, or ¼ of its length into the receptacle 26. As previously mentioned, the spring 28 should extend sufficiently into the receptacle 26 so that the lateral forces exerted on the spring 28 by the tether 52 are transferred between the sides of the spring 28 and the receptacle 26, rather than exerted on the first end 48 of the spring. More than one-half of the spring 28 should extend out of the receptacle 26 to prevent the receptacle from stiffening the spring 28 and undesirably increasing its resistance to lateral forces. The lateral and axial resilience of the spring 28 also reduces the exertion of lateral forces on the stake assembly 20 and receptacle 26, thereby greatly reducing wear on the inside surfaces of the receptacle 26 and reducing the ability of such forces to wallow out the receptacle 26 and loosen the stake assembly 20 from its engagement in the ground. A ½-inch metal ring 54 is connected to the second end 50 of the spring 28 and the tether clip 58, which may be a snap hook, spring clip, or the like, is detachably connected to the ring 54. As previously discussed, the metal ring 54 acts as a universal joint, allowing the tether 52 and tether clip 58 greater freedom of motion (than a direct connection of the clip 58 to the second end 50) with respect to the stake assembly 20, and preventing the tether clip 58 from binding on the second end 50 and disconnecting itself from the stake assembly 20. The controlling member 29 is preferably a light weight chain having a length of about 9 inches which is less than the plastic deformation stressed length of the associated coil spring 28. The controlling member 29 can be connected at its ends 59,61 to associated structure by any means known in the art which will withstand the environment in which it will be subjected.

The prototype stake assembly 20 described is sized for average size dogs. The stake assembly 20 may be made in various sizes and various strengths of materials as necessary to accommodate the size and strength of an animal, the forces to be exerted on the stake assembly by an object to be restrained, and the forces to be encountered in imbedding the stake assembly in the various conditions of soil and rock encountered in the ground, as would be known to one of ordinary skill in the art in view of the disclosure contained herein. Further, one skilled in the art can without undue experimentation and invention determine the appropriate length of the controlling member 29 once the spring 28 has been selected and its physical properties known.

The use of the controlling member 29 of this invention, in combination with the advantages of a spring 28 being the only element extending upwardly which might damage an individual falling thereupon, the stake assembly is protected from damage resulting from excessive stress and it allows the use of a spring having less mass and thereby further protects individuals from injury. Therefore the invention also saves natural resources, time, manpower and equipment.

While presently preferred embodiments of the invention have been described herein for the purpose of disclosure, numerous changes in the construction and arrangement of the parts and/or the performance of steps will suggest themselves to those skilled in the art in view of the disclosure contained herein, which changes are encompassed within the spirit of this invention as defined by the following claims.

What is claimed is:

1. A stake assembly for placing in the ground so that the stake assembly has no rigid structure extending substantially above the surface of the ground, comprising:

a spike having a first end and a second end defining a longitudinal axis of the stake assembly;

a flange connected at the second end of the spike and extending laterally therefrom, the flange having an opening extending into the receptacle of the spike, a lower surface facing the first end of the spike for covering the surface of the ground adjacent to the spike and limiting the penetration of the stake assembly into the ground and an upper surface forming the axial extremity of the second end of the spike so that the second end of the spike and the upper surface of the flange are adapted to be substantially flush with the surface of the ground when the spike assembly is placed in the ground;

a receptacle extending axially into the flange from the second toward the first end of the spike;

a resilient fastening member having a first end connected to the stake within the receptacle between the lower surface of the flange and the first end of the spike, and a second end extending out of the receptacle beyond the upper surface of the flange, the resilient fastening member being both axially and laterally resilient continuously between the first and second ends of the resilient fastening member so that the stake assembly has no rigid structure extending beyond the upper surface of the flange at any time; and a controlling member having first and second ends and being laterally flexible, substantially linearly inflexible, and having a length greater than the resilient fastening member in its normal unstressed condition, said first end being connected to the stake within the receptacle and said second end being connected to said second end of the resilient fastening member for limiting the amount of movement of the second end of the fastening member in a direction away from the stake.

2. A stake assembly, as set forth in claim 1, wherein the length of the controlling member is less than linear length of expansion of the resilient fastening member at which the fastening member is deformed in response to linear expansion thereof.

3. A stake assembly, as set forth in claim 1, wherein the resilient fastening member has a preselected unstressed length and the controlling member has a preselected unstressed length greater than the unstressed length of the resilient member.

4. A stake assembly, as set forth in claim 1, wherein the resilient member is a coil spring and the controlling member is a metal cable.

5. A stake assembly, as set forth in claim 1, wherein the controlling member is formed of nylon cord.

6. A stake assembly, as set forth in claim 1, wherein the controlling member is a metal chain.

7. A stake assembly, as set forth in claim 1, wherein the second end of the controlling member is directly connected to the second end of the resilient fastening member.

8. A stake assembly, as set forth in claim 1, including means for directly attaching a leash line to the second end of the resilient fastening member and the controlling member.

9. A stake assembly, as set forth in claim 1, wherein all elements of the stake assembly are formed of metal.

10. A stake assembly, as set forth in claim 1, wherein the resilient fastening member is a helically wound coil spring defining a chamber therethrough, and wherein the controlling member passes from its first end, upwardly through the chamber of the coil spring.

11. A stake assembly, as set forth in claim 1, wherein a second end portion of the resilient fastening member is tapered.

12. A stake assembly, as set forth in claim 1, wherein the first end of the controlling member is connected to the spike adjacent the first end of the resilient fastening member.

13. A stake assembly, as set forth in claim 1 including means for maintaining a first end portion of the controlling member within the resilient fastening member.

14. A stake assembly, as set forth in claim 13, wherein the maintaining means is a plug maintained with the second end portion of the resilient fastening member and in forcible contact with the controlling member.

15. A stake assembly, as set forth in claim 13, wherein the maintaining means includes a ring.

16. A stake assembly, as set forth in claim 13, wherein the maintaining means is one of a chain link or ring having a size greater than the opening at the second end of the resilient fastening member with said chain link or ring being a portion of the controlling member.

17. A stake assembly, as set forth in claim 13, including a holding element, fixedly connected to the second end of the resilient fastening member and the controlling element.

18. A stake assembly, as set forth in claim 1, wherein the stake assembly is formed of plastic.

* * * * *